US008923655B1

(12) United States Patent
Weston et al.

(10) Patent No.: US 8,923,655 B1
(45) Date of Patent: Dec. 30, 2014

(54) USING SENSES OF A QUERY TO RANK IMAGES ASSOCIATED WITH THE QUERY

(71) Applicant: Google Inc., Mountain View, CA (US)

(72) Inventors: Jason Weston, New York, NY (US); Samy Bengio, Mountain View, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 13/650,489

(22) Filed: Oct. 12, 2012

Related U.S. Application Data

(60) Provisional application No. 61/547,601, filed on Oct. 14, 2011.

(51) Int. Cl.
*G06K 9/60* (2006.01)

(52) U.S. Cl.
USPC ........... 382/305; 382/115; 382/128; 382/159; 382/170; 382/203

(58) Field of Classification Search
CPC ....... G06K 9/46; G06K 9/34; G06K 9/00335; G06F 17/30244; G06F 17/30247; G06F 17/30265; G06F 17/30333; G06F 17/30855; G06F 17/30619
USPC ......... 382/115, 128, 159, 170, 203, 181, 305; 707/821, 831; 358/403, 404
See application file for complete search history.

(56) References Cited

U.S. PATENT DOCUMENTS

2007/0250491 A1* 10/2007 Olszak et al. .................. 707/3
2011/0188713 A1* 8/2011 Chin et al. .................. 382/118
2012/0283574 A1* 11/2012 Park et al. .................. 600/476

OTHER PUBLICATIONS

Berle et al., "Histogram Intersection Kernel for Image Classification", Proceedings of the International Conference on Image Processing, 2003, pp. 513-516.
Barnard et al., "Word Sense Disambiguation with Pictures", Proceedings of the HLT-NAACL 2003 Workshop on Learning Word Meaning from Non-Linguistic Data, (2003) 5 pages.
Boser et al., "A Training Algorithm for Optimal Margin Classifiers", Proceedings of the 5th Annual ACM Workshop on Computational Learning Theory, (1992) pp. 144-152.
Crammer et al., "On the Algorithmic Implementation of Multiclass Kernel-Based Vector Machines", Journal of Machine Learning Research 2 (2001) pp. 265-292.
Yarowsky, "Unsupervised Word Sense Disambiguation Rivaling Supervised Methods", Proceedings of the $33^{rd}$ Annual Meeting on Association for Computational Linguistics, 1995, pp. 189-196.
Deng et al., "ImageNet: A Large-Scale Hierarchical Image Database", IEEE Conference on Computer Vision and Pattern Recognition, (2009) 8 pages.

(Continued)

*Primary Examiner* — Ali Bayat
(74) *Attorney, Agent, or Firm* — Harrity & Harrity, LLP

(57) ABSTRACT

A server device determines a plurality of images for a query. One or more images, of the plurality of images, are associated with one or more senses of the query. The server device maps the plurality of images into a space by representing the plurality of images with corresponding points in the space; determines one or more hyperplanes in the space based on the corresponding points in the space; calculates one or more scores for the plurality of images based on the corresponding points and the one or more hyperplanes; and ranks the one or more images based on the one or more scores.

20 Claims, 9 Drawing Sheets

(56) References Cited

OTHER PUBLICATIONS

Grangier et al., "A Neural Network to Retrieve Images from Text Queries", Appears in the International Conference on Artificial Neural Networks, (2006) 10 pages.

Grangier et al., "A Discriminative Kernel-Based Model to Rank Images from Text Queries", IEEE Transactions on Pattern Analysis and Machine Intelligence, vol. 30, Issue 8, (2008) 14 pages.

Guillaumin et al., "TagProp: Discriminative Metric Learning in Nearest Neighbor Models for Image Auto-Annotation", Appears in the International Conference on Computer Vision, Sep. 2009, pp. 306-316.

Jeon et al., "Automatic Image Annotation and Retrieval Using Cross-Media Relevance Models", Proceedings of the 26th Annual International ACM SIGIR Conference on Research and Development in Information Retrieval, 2003, pp. 119-126.

Saenko et al., "Filtering Abstract Senses from Image Search Results", Appears in Advances in Neural Information Processing Systems 22 (2009) pp. 1589-1597.

Grauman et al., "The Pyramid Match Kernel: Efficient Learning with Sets of Features", Journal of Machine Learning Research 8 (2007) pp. 725-760.

Leung et al., "Representing and Recognizing the Visual Appearance of Materials Using Three-Dimensional Textons", International Journal of Computer Vision, vol. 43, No. 1, (2001) pp. 29-44.

Loeff et al., "Discriminating Image Senses by Clustering with Multimodal Features", Proceedings of the COLING/ACL 2006 Main Conference Poster Sessions, 2006, pp. 547-554.

Makadia et al., "A New Baseline for Image Annotation", Proceedings of the 10th European Conference on Computer Vision: Part III, 2008, pp. 316-329.

Miller, "WordNet: A Lexical Database for English", Communications of the ACM, vol. 38. No. 11, Nov. 1995, pp. 39-41.

Monay et al., "On Image Auto-Annotation with Latent Space Models", Proceedings of the 11th ACM International Conference on Multimedia, 2003, pp. 275-278.

Schölkopf et al., "Kernel Principal Component Analysis", Appears in Advances in Kernel Methods—Support Vector Learning, 1999, pp. 327-352.

Wan et al., "A Latent Model for Visual Disambiguation of Keyword-Based Image Search", Appears in the British Machine Vision Conference, (2009) 9 pages.

Weston et al., "WSABIE: Scaling Up to Large Vocabulary Image Annotation", Proceedings of the International Joint Conference on Artificial Intelligence, 2011, pp. 2764-2770.

Zien et al., "Training and Approximation of a Primal Multiclass Support Vector Machine", In the 12th International Conference on Applied Stochastic Models and Data Analysis, (2007) 8 pages.

Agirre et al., "Word Sense Disambiguation—Algorithms and Applications (Text, Speech and Language Technology)", 1st Edition, vol. 33, Springer, Nov. 2007, 366 pages.

P. Basile et al., "Exploiting Disambiguation and Discrimination in Information Retrieval Systems," Web Intelligence/IAT Workshops, pp. 539-542, 4 total pages, 2009.

Y. Chang et al., "Image Sense Classification in Text-Based Image Retrieval," Information Retrieval Technology, pp. 124-135, 12 total pages, 2009.

R. Navigli, "Word Sense Disambiguation: A Survey," ACM Computing Surveys (CSUR), 41(2):10, 69 total pages, 2009.

T. Nykiel et al. "Word Sense Discovery for Web Information Retrieval," Data Mining Workshops, 2008, ICDMW '08, IEEE International Conference, pp. 267-274, 8 total pages, Dec. 2008.

T. Pedersen et al., "Distinguishing Word Senses in Untagged Text," EMNLP, vol. 2, pp. 197-207, 11 total pages, 1997.

Purandare et al., "Word Sense Discrimination by Clustering Contexts in Vector and Similarity Spaces," CoNLL, pp. 41-48, 8 total pages, 2004.

K. Saenko et al., "Filtering Abstract Senses from Image Search Results," NIPS, pp. 1589-1597, 9 total pages, 2009.

\* cited by examiner s = 1    s = 2    s = 3

# USING SENSES OF A QUERY TO RANK IMAGES ASSOCIATED WITH THE QUERY

RELATED APPLICATION

This application claims priority to Provisional Patent Application No. 61/547,601, filed Oct. 14, 2011, the contents of which are herein incorporated by reference.

BACKGROUND

The World Wide Web, "web," contains a vast amount of images. An image search engine, such as a web-based image search engine, assists users in locating desired images by indexing images from the web. Typically, the image search engine may associate text, such as text that occurs near a particular image, with the image. The text associated with the images may then be searched using keyword-based search queries to locate images relevant for the search.

When a user provides a search query for images to an image search engine, the image search engine may return hundreds of results, including, for example, images and/or links to images. Because the relevancy of the results may be primarily determined based on text associated with the image, such as text near the image in a web page, the image itself may not match the search query or may be of relatively low relevance. For example, a search for "Eiffel Tower" may result in some images that include the Eiffel Tower and other images that do not include the Eiffel tower, but which had the text "Eiffel Tower" near the images.

SUMMARY

According to some possible implementations, a method may include determining, by one or more server devices, a plurality of images for a query, where one or more images, of the plurality of images, may be associated with one or more senses of the query; mapping, by the one or more server devices, the plurality of images into a space by representing the plurality of images with corresponding points in the space; determining, by the one or more server devices, one or more hyperplanes in the space based on the corresponding points in the space, where a first hyperplane, of the one or more hyperplanes, may be associated with a first sense of the one or more senses, and where a second hyperplane, of the one or more hyperplanes, may be associated with a second sense of the one or more senses; calculating, by the one or more server devices, one or more scores for the plurality of images based on the corresponding points and the one or more hyperplanes; and ranking the one or more images based on the one or more scores.

Additionally, or alternatively, the method may further include receiving the query; and providing a search result document for the query based on the ranking of the one or more images.

Additionally, or alternatively, the search result document may include a first group of images, of the one or more images, that are associated with the first sense, and a second group of images, of the one or more images, that are associated with the second sense.

Additionally, or alternatively, the search result document may not include one of the plurality of images that is not associated with at least one of the one or more senses.

Additionally, or alternatively, the method, when determining the plurality of images for the query, may include identifying the plurality of images for the query based on at least one of click-through information associated with the plurality of images or terms used to label the plurality of images.

Additionally, or alternatively, the method, when mapping the plurality of images into the space, may include: placing one or more first points, of the corresponding points, that are associated with the first sense into a first area of the space; placing one or more second points, of the corresponding points, that are associated with the second sense into a second area of the space, where the second area may be different from the first area; and placing one or more third points, of the corresponding points, that are not associated with the first sense or the second sense into a third area of the space, where the third area may be different from the first area and the second area.

Additionally, or alternatively, the one or more first points may be located on a first side of the first hyperplane, the one or more second points may be located on a first side of the second hyperplane, and the one or more third points may be located on a second side of the first hyperplane and located on a second side of the second hyperplane.

Additionally, or alternatively, the method, when calculating the one or more scores, may include: determining a first score based on a first distance, in the space, between a particular point, of the corresponding points, and the first hyperplane; determining a second score based a second distance, in the space, between the particular point and the second hyperplane; and determining a particular score, of the one or more scores, based on the first score and the second score, where the particular score may be for a particular image, of the plurality of images, that corresponds to the particular point.

Additionally, or alternatively, the particular score may be equal to the first score when the first score is greater than the second score, and the particular score may be equal to the second score when the second score is greater than the first score.

Additionally, or alternatively, the method, when determining the particular score may include: determining a first weighted score based on a first weight and the first score; determining a second weighted score based on a second weight and the second score; and determining the particular score based on the first weighted score and the second weighted score, where the first weight may be based on a first click-through rate for a first portion of the one or more images associated with the first sense, and where the second weight may be based on a second click-through rate for a second portion of the one or more images associated with the second sense.

According to some possible implementations, a system may include one or more processors to: determine a plurality of images for a query, where one or more images, of the plurality of images, may be associated with two or more senses of the query; place a plurality points in a space to represent the plurality of images; determine a first hyperplane in the space based on one or more first points, of the plurality of points, that are associated with a first sense of the two or more senses; determine a second hyperplane in the space based on one or more second points, of the plurality of points, that are associated with a second sense of the two or more senses; calculate a plurality of scores for the plurality of images based on the plurality of points, the first hyperplane, and the second hyperplane; and rank the plurality of images based on the plurality of scores.

Additionally, or alternatively, the one or more processors may further: identify the query from a client device, retrieve, based on the query and the ranking of the plurality of images, a first set of images, of the one or more images, that are associated with the first sense and a second set of images, of the one or more images, that are associated with the second sense, and provide the first set of images and the second set of images to the client device.

Additionally, or alternatively, the one or more processors, when calculating the plurality of scores, may determine a first score based on a first distance, in the space, between a particular point, of the plurality of points, and the first hyperplane; determine a second score based a second distance, in the space, between the particular point and the second hyperplane; and determine a particular score, of the plurality of scores, based on the first score and the second score, where the particular score may be for a particular image, of the plurality of images, that corresponds to the particular point.

Additionally, or alternatively, the one or more processors, when determining the particular score, may determine a first weighted score based on the first score and a first weight that is based on a first click-through rate associated with the first sense; determine a second weighted score based on the second score and a second weight that is based on a second click-through rate associated with the second sense; and determine the particular score based on the first weighted score and the second weighted score.

Additionally, or alternatively, the one or more processors, when determining the particular score may determine that the first score is greater than the second score; determine that the particular image is associated with the first sense based on the first score being greater than the second score; and determine that the particular score is equal to the first score.

According to some possible implementations, a non-transitory computer-readable medium may store instructions. The instructions may include one or more instructions that, when executed by at least one device, cause the at least one device to: identify a plurality of images associated with a query, where one or more images, of the plurality of images, may be associated with two or more senses of the query; place, into a space, a plurality of points that correspond to the plurality of images; determine a first hyperplane in the space based on one or more first points, of the plurality of points, that are associated with a first sense of the two or more senses; determine a second hyperplane in the space based on one or more second points, of the plurality of points, that are associated with a second sense of the two or more senses; determine a particular score for a particular image, of the plurality of images, based on a first distance from a particular point, of the plurality of points, to the first hyperplane and a second distance from the particular point to the second hyperplane, where the particular point may correspond to the particular image; and rank the particular image, relative to the plurality of images, based on the particular score.

Additionally, or alternatively, the one or more instructions to determine the particular score for the particular image may include one or more instructions that, when executed by the at least one device, cause the at least one device to: determine a first score based on the first distance; determine a second score based on the second distance; determine that the first score is greater than the second score; determine that the particular image is associated with the first sense based on the first score being greater than the second score; and determine that the particular score is equal to the first score after determining that the first score is greater than the second score.

Additionally, or alternatively, the one or more instructions to place the plurality of points may include one or more instructions that, when executed by the at least one device, cause the at least one device to: place one or more first points, of the plurality of points, that are associated with the first sense into a first area of the space; place one or more second points, of the plurality of points, that are associated with the second sense into a second area of the space; where the second area may be different from the first area; and place one or more third points, of the plurality of points, that are not associated with the first sense or the second sense into a third area of the space, where the third area may be different from the first area and the second area.

Additionally, or alternatively, the instructions may further include one or more instructions that, when executed by the at least one device, cause the at least one device to: receive the query from a client device; identify a first quantity of images, of the one or more images, that are associated with the first sense; identify a second quantity of images, of the one or more images, that are associated with the second sense; and provide, to the client device, results based on the first quantity of images and the second quantity of images.

Additionally, or alternatively, the one or more instructions to rank the images may include one or more instructions that, when executed by the at least one device, cause the at least one device to: determine that other images, of the plurality of images, are not associated with the two or more senses of the query, and determine a ranking of only the one or more images that are associated with the two or more senses of the query. The one or more instructions may further include one or more instructions that, when executed by the at least one device, cause the at least one device to: receive the query from a client device, and provide, based on the query and the ranking, results that include only images of the one or more images.

The above discussion mentions examples in which some implementations may be implemented via one or more methods performed by one or more server devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A sense may indicate a particular meaning, which signifies a category/type of images, associated with a query. A hyperplane may include a plane that separates one or more points in a space from all other points in the space. Each point in the space may represent an image associated with a query. A line may be used to represent the hyperplane in the space.

An implementation described herein may use senses of a query to rank images associated with the query in order to provide relevant images for the query. An image search engine may identify images associated with a query. The image search engine may map the images into a space. Each one of the mapped images may be represented by a point in space. The image search engine may identify different senses, of the query, by grouping points that are in a particular area and associating the particular area with a particular sense. The image search engine may determine that points that are not grouped into any sense correspond to images that are not relevant to the query. The image search engine may rank images that are grouped into the senses. The image search engine may provide a result for the query. The result may include top-ranked images from two or more groupings associated with the senses of the query. As a result, users may expend less time and effort sorting through irrelevant images.

Figure 1:
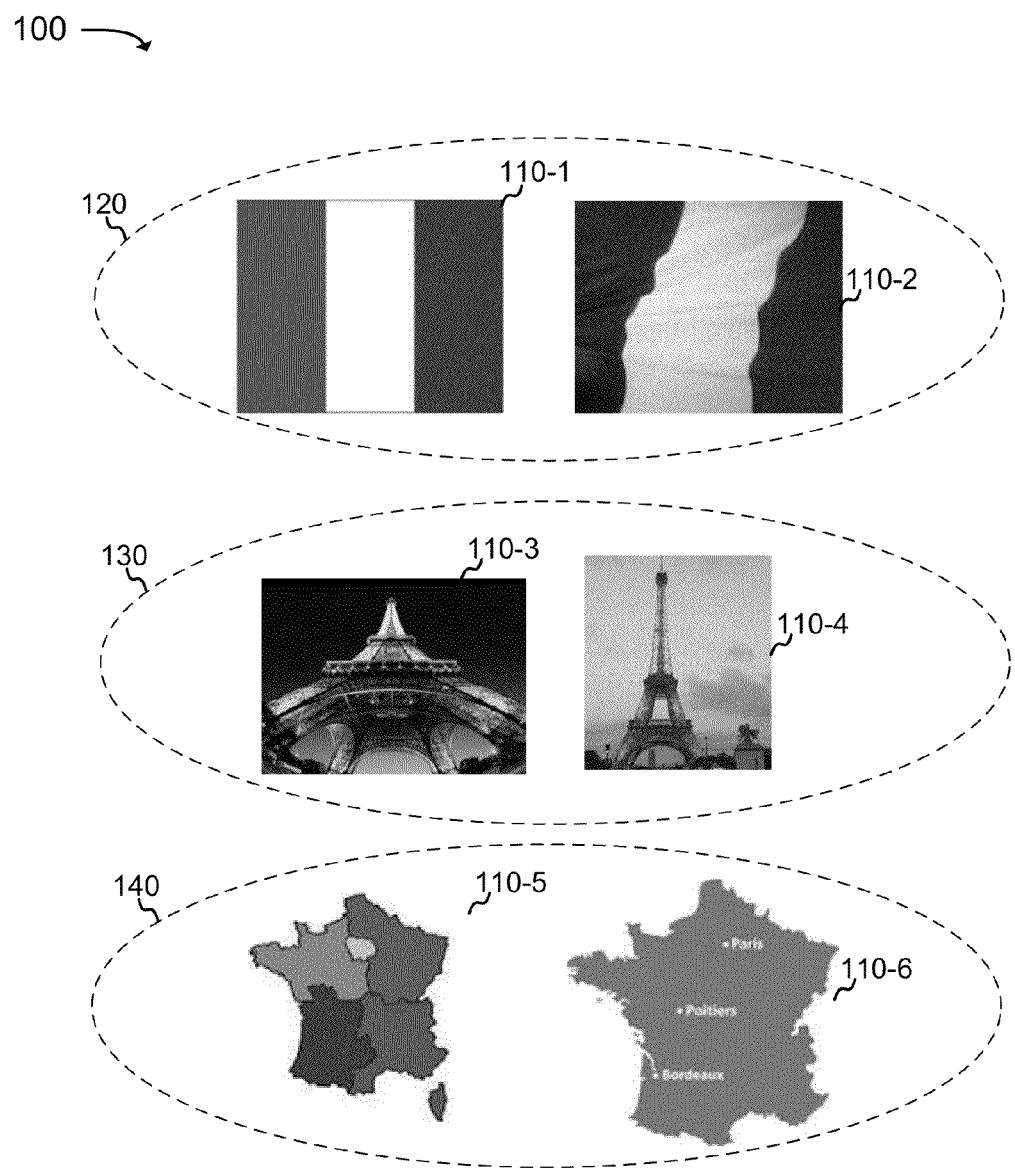
FIG. 1 is a diagram providing an overview of concepts described herein.

FIG. 1 is a diagram providing an overview 100 of a concept described herein. In this example, assume that a user provides the query "France" to an image search engine. Assume that the image search engine identifies six relevant images associated with the query "France," including images 110-1 through 110-6. Images 110-1 through 110-6 may include images from several distinct senses, including a first sense 120, a second sense 130, and a third sense 140. First sense 120 may include images of the French flag, including images 110-1 and 110-2. Second sense 130 may include images of French monuments, including images 110-3 and 110-4 of the Eiffel tower. Third sense 140 may include images of maps of France, including images 110-5 and 110-6. By determining the different senses associated with the query "France," the image search engine may avoid including, as part of a result, images that are not within one of the senses, such as first sense 120, second sense 130, and third sense 140, of the query "France," and therefore, likely, irrelevant.

Figure 2:
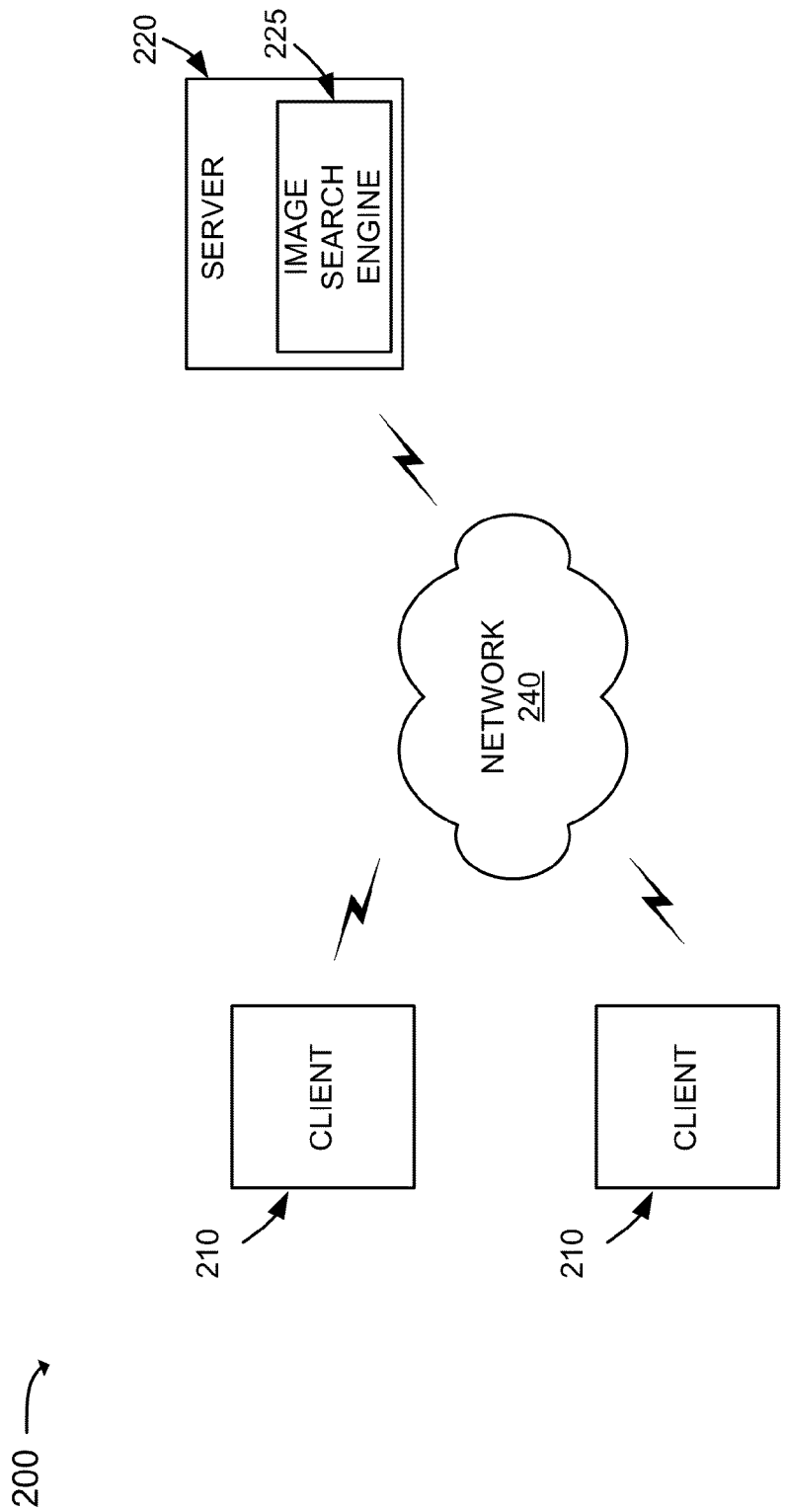
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple clients 210 connected to a server 220 via a network 240. Two clients 210 and one server 220 have been illustrated as connected to network 240 for simplicity. In practice, there may be additional clients and/or servers. Also, in some instances, a client may perform one or more functions of a server and a server may perform one or more functions of a client.

Also, components of environment 200 may interconnect via wired and/or wireless connections. In other words, any two components, of environment 200, may communicate via a wired connection, a wireless connection, or a combination of a wired connection and a wireless connection.

A client 210 may include any computation or communication device, such as a communication device that is capable of communicating with server 220 via network 240. In some implementations, client 210 may take the form of a web service terminal, a personal computer, a laptop, a handheld computer, a smart phone, a mobile telephone device, a personal digital assistant (PDA), a personal media player, a set-top box (STB) connected to a video display device, including, for example, a television, or any other type of computation or communication device capable of transmitting data to server 220 or receiving data from server 220. In another implementation, client 210 may represent multiple devices operated by a user, including, for example, a personal computer and a mobile device.

Server 220 may include any computation or communication device, such as a communication device that is capable of communicating with client 210 via network 240. Server 220 may include one or more server devices and/or one or more computer systems that process, search, and/or maintain documents, such as images. Server 220 may include an image search engine 225 usable by clients 210. In general, in response to a client request, image search engine 225 may provide images to client 210 that are relevant to the client request.

Network 240 may include a single network, multiple networks of a same type, or multiple networks of different types. For example, network 240 may include one or more of: a direct connection between devices/components, a local area network (LAN), a wide area network (WAN), including, for example, the Internet, a metropolitan area network (MAN), a wireless network, including, for example, a general packet radio service (GPRS) network, a telephone network, including, for example, a Public Switched Telephone Network (PSTN) or a cellular network, a subset of the Internet, an ad hoc network, or any combination of the aforementioned networks.

Figure 3:
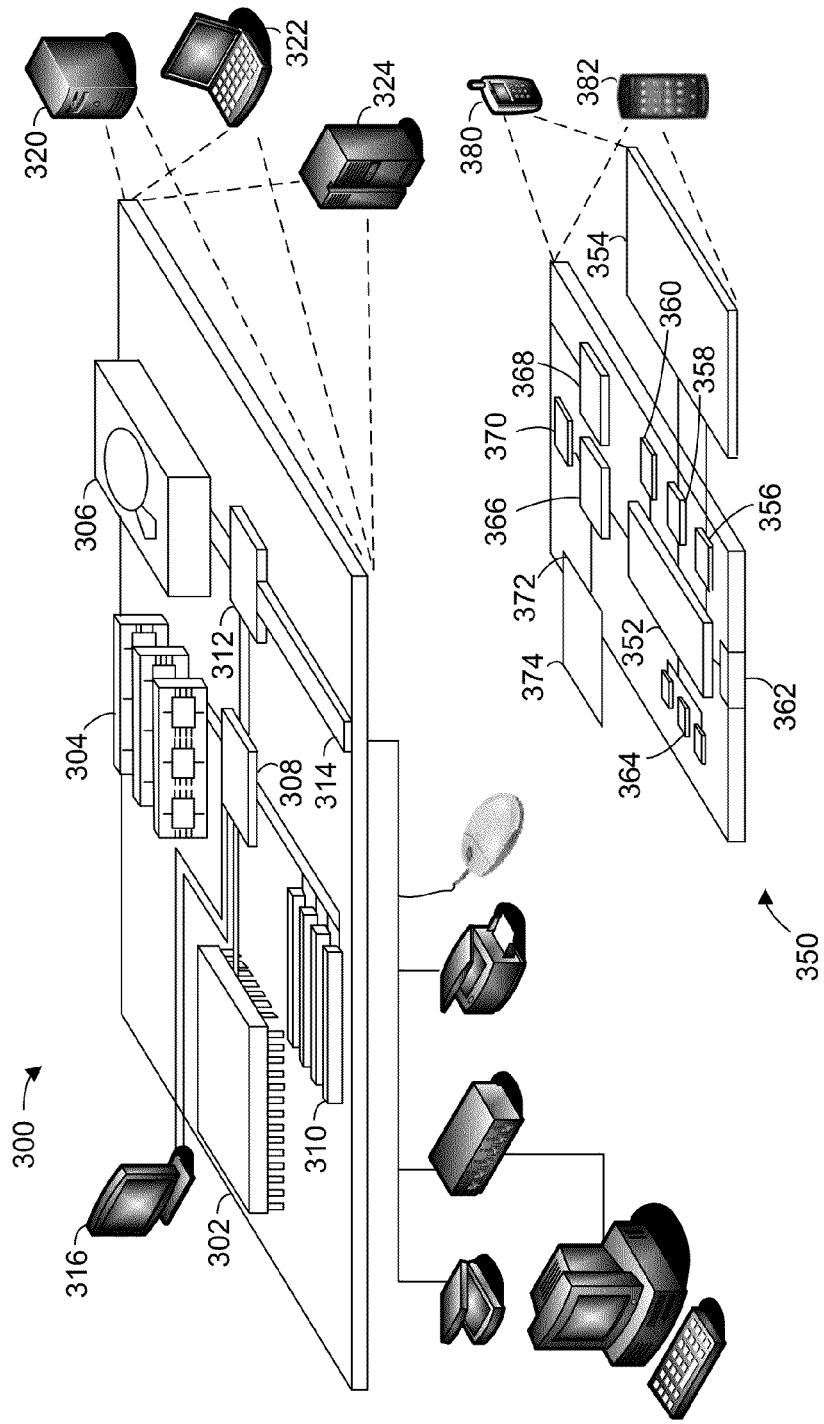
FIG. 3 illustrates an example of a generic computing device and a generic mobile computing device.

FIG. 3 illustrates an example of a generic computing device 300 and a generic mobile computing device 350, which may be used with the techniques described herein. Computing device 300 may correspond to, for example, client 210 and/or server 220. For example, each of clients 210 and server 220 may include one or more computing devices 300 and/or one or more components of computing device 300. Mobile computing device 350 may correspond to, for example, a portable implementation of client 210.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In another implementation, multiple processors and/or multiple buses may be used, as appropriate, along with multiple memories and types of memory. Also, multiple computing devices 300 may be connected, with each device providing portions of the necessary operations, including, for example, as a server bank, a group of blade servers, or a multi-processor system, etc.

Memory 304 may store information within computing device 300. In some implementations, memory 304 may include a volatile memory unit or units. In some implementations, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical storage device or spread across multiple physical storage devices.

Storage device 306 may provide mass storage for computing device 300. In some implementations, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In some implementations, high-speed controller 308 may be coupled to memory 304, display 316, and to high-speed expansion ports 310, which may accept various expansion cards. In the implementation, low-speed controller 312 may be coupled to storage device 306 and to low-speed expansion port 314. Low-speed expansion port 314, which may include various communication ports, including, for example, USB, Bluetooth™, Ethernet, wireless Ethernet, etc. may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device, such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a microdrive or other device (not shown), to provide additional storage. Each of components 350, 352, 364, 354, 366, and 368, may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a Thin-Film-Transistor Liquid Crystal Display (TFT LCD), an Organic Light Emitting Diode (OLED) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a Single In Line Memory Module (SIMM) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In some implementations, a computer program product may be tangibly embodied in an information carrier. The computer program product may store instructions that, when executed, perform one or more methods, such as those described above. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, including, for example, voice messages, music files, etc., and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant, and/or other similar mobile device.

Various implementations of the systems and techniques described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device, including, for example, magnetic discs, optical disks, memory, Programmable Logic Devices (PLDs), etc. used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device, including, for example, a cathode ray tube (CRT) or a liquid crystal display (LCD) monitor, for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback, including, for example, visual feedback, auditory feedback, or tactile feedback; and input from the user may be received in any form, including acoustic, speech, or tactile input.

The systems and techniques described herein may be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

Although FIG. 3 shows example components of computing device 300 and mobile computing device 350, computing device 300 or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

Figure 4:
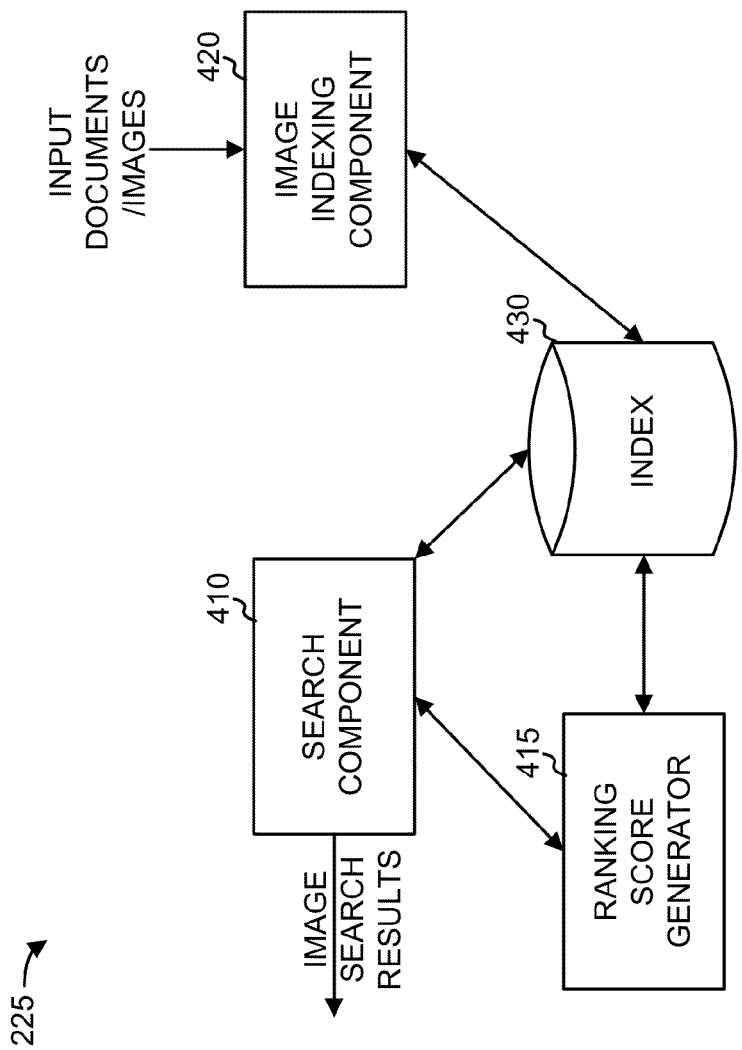
FIG. 4 is a diagram of example functional components of an image search engine.

FIG. 4 is a diagram of example functional components of image search engine 225. As shown in FIG. 4, image search engine 225 may include a search component 410, a ranking score generator 415, an image indexing component 420, and an index 430. In some implementations, the functions described in connection with FIG. 4 may be performed by one or more components of computing device 300 (FIG. 3) or one or more computing devices 300.

Search component 410 may receive a user search query, such as from client 210, search index 430 for images based on the search query, and generate a search result document, including, for example, the images and/or links to the images. Search component 410 may generally match terms in the search query to the descriptive text associated with the images in order to identify the images. Additionally, search component 410 may take into account the image ranking score determined for the images that are identified as relevant to the search query.

Ranking score generator 415 may generate the ranking scores. In some implementations, ranking score generator 415 may dynamically generate the ranking scores for images in a set of images that match the user's query. In some implementations, ranking score generator 415 may generate the ranking scores "offline," not in response to a user search query, based on, for example, size, quality, aspect ratio, date information, etc. Index 430 may store the generated ranking scores. Although shown as a separate element in FIG. 4, in some implementations, ranking score generator 415 may be considered as being part of search component 410 or image indexing component 420. The calculation of the ranking scores by ranking score generator 415 will be described in additional detail below.

In general, image indexing component 420 may receive input documents, such as HTML web pages retrieved from the web, and parse the input documents for text and images that are included in the input documents. In some implementations, image indexing component 420 may store images, or links to images, and image descriptive text in index 430. The image descriptive text may include terms that identify the image.

Index 430 generally stores a collection of data. Index 430 may be implemented as, for example, a relational or non-relational database capable of storing and accessing data. Index 430 may be implemented on a single computing device or distributed across multiple computing devices and/or storage devices. For a particular image, index 430 may store an entry that includes information identifying the image, a link to the image, descriptive text associated with the image, and/or a list of documents, e.g., web pages, that include the image.

Calculating Ranking Scores and Ranking Images

Image search engine 225 may use a model to rank images associated with a query. The model may explicitly learn the senses of a given query that optimizes an image ranking cost function jointly over all senses. The training data for an image ranking task may be of one or more types, such as click-through based training data and/or human-annotated training data. The click-through based training data may include images and information regarding how many users clicked on a given image, of the images, for a given query. The human-annotated training data my include images that were labeled by human(s) with information that indicates whether each one of the images is relevant for a give query.

Image search engine 225 may learn the senses of the query in the following way: model the desired ranking function as containing S components for the S senses, and optimize the overall ranking loss for all senses jointly and, possibly, also optimize S. This approach may provide improved ranking metrics over systems that do not model the senses both for random queries and particularly for queries with multiple senses.

The model may be designed for the image ranking task defined as follows: receiving or obtaining a set of text-based queries and a set of training data for each query in the set of text-based queries. The training data may include positive training images $x^+ \in x_q^+$ that are relevant to a query q and negative training images $x^- \in x_q^-$ that are irrelevant to the query q. The goal is, given a query, to rank a set of test images such that relevant images are ranked at the top of the list, above the irrelevant ones. Note that no information about the senses of a query, and hence the senses of the relevant images, is given in the training data, and yet a query such as "jaguar" has at least two kinds of relevant images: images of cars of that model, and images of Panthera, big cats. To model that phenomenon a ranking function may be defined, per query, and per sense:

$$f_{q,s}(x) = W_{q,s} \cdot x,$$

where q is the query, $x \in R^D$ is an input image, represented with features in D-dimensional space, $W_{q,s}$ are the parameters of the model, and s is the $s^{th}$ sense for this query. The ranking function generates a real-valued output that measures the degree of match between a query q and an image x, where a large value means a higher match, i.e., the larger the value, the better the match.

For a given query, after an image is scored in terms of its relevance match with respect to each sense, those scores may be combined to give an overall relevance match, independent of sense:

$$f_q(x) = \max_{s \in S(q)} f_{q,s}(x) = \max_{s \in S(q)} W_{q,s} \cdot x$$

where S(q) is the quantity of semantic classes, and hence hyperplanes, that are used for the given query q. In other words, the quantity of discovered senses may be variable depending on the query. If an image is relevant with respect to any one of the senses, then the image may be relevant for the query. Finally, the entire set of images may be ranked by their matching scores using $f_q(x)$.

To train the model, image search engine 225 may: (i) determine to which sense an image belongs in order to determine which hyperplane the image should be assigned to without going through the max function; and (ii) determine how many total senses S(q) there are for each query. Image search engine 225 may use cross-validation, trying each value of S(q) and selecting the one that does best in order to determine how many total senses S(q) there are for each query. In order to determine which sense an image belongs to, image search engine 225 may train the model with fixed S(q) so that the maximum sense score, for a positive image, is greater than the maximum sense score for a negative image, plus some margin:

$$\max_{s \in S(q)} f_{q,s}(x^+) > \max_{s \in S(q)} f_{q,s}(x^-) + 1, \forall\, x^+ \neq x^-.$$

In some implementations, one or more devices that are separate from image search engine 225 may train the model and/or provide the training data to train the model.

Image search engine 225 may also regularize the weight vectors by enforcing the following constraints:

$$\|W_{q,s}\|^2 \leq C, \forall_{q,s} \qquad (2)$$

where C is a constant whose value is determined empirically. That is, the overall optimization problem is:

$$\text{minimize} \sum_{q, x^+ \in \chi_q^+, x^- \in \chi_q^-} \xi_{(q, x^+, x^-)} \text{ subject to}$$

$$\max_{s \in S(q)} f_{q,s}(x_{q,i}^+) > \max_{s \in S(q)} f_{q,s}(x^-) + 1 - \xi_{(q, x^+, x^-)}$$

$$\forall\, q, x^+ \in \chi_q^+, x^- \in \chi_q^-, \text{ and}$$

$$\|W_{q,s}\|^2 \leq C, \forall\, q, s$$

$$\xi_{(q, x^+, x^-)} \geq 0, \forall\, q, x^+, x^-.$$

where the slack variables $\xi$ measure the margin-based ranking error per constraint. As all the parameters are actually decoupled between queries q, image search engine 225 may learn the parameters independently per query- and hence train in parallel. Image search engine 225 may choose to optimize the problems by stochastic gradient descent (SGD). Possible steps for training the system (e.g., the model), are included in the algorithm below.

Possible steps for training the model are given in the following algorithm:
for each query q do
    Input: labeled data $x^+ \in x_q^+$ and $x^- \in x_q^-$ (specific for query q).
    Initialize the weights W(q, s) randomly with mean 0 and standard deviation $\sqrt{D}$.
    for each S(q) to try (e.g., S(q)=1, . . . , 5) do
        repeat
            Pick a random positive example $x^+$.
        Let $f_{q,s}(x^+) = \max_{s \in S(q)} W_{q,s} \cdot x^+$
            Pick a random negative example $x^-$.
        Let $f_{q,s}(x^-) = \max_{s \in S(q)} W_{q,s} \cdot x^-$
        if $f_{q,s}(x^+) < f_{q,s}(x^-) + 1$ then
            Make a gradient step to minimize:
        $|1 - f_{q,s}(x+) + f_{q,s}(x^-)|+$
            Project weights to enforce constraints (2).
        end if
        until validation error does not improve.
    end for
    Keep the model (with the value of S(q)) with the best validation error.
end for
After learning the senses of the query, image search engine 225 may analyze the word/image senses that the model has learned. For any given query, image search engine 225 may determine the value S(q) that is learned. In other words, the quantity of senses that are chosen.

The database of images may be ranked by each sense sub-model of the model, i.e. a ranked list of images for each f(q, s) may be produced. Each sub-model may identify a different sense/aspect of the query concept.

In order to further determine the actual word sense that each sub-model is identifying, image search engine 225 may use the following technique:

Find the top N most similar hyperplanes to W(q, s) by measuring $$\frac{W(q, s) \cdot W(q', s')}{\|W(q, s)\| \cdot \|W(q', s')\|}$$

for all q' where q≠q' and all s'∈S(q'). That is, by measuring the cosine similarity between hyperplanes, the most similar concepts from individual senses from other queries are found.

Return the query text for each of the top-scoring q'. If, for example, multiple senses for the query "jaguar" are found, then one of the senses should be similar to queries like "lion" and "tiger" and the other sense should be similar to queries like "Audi" and "BMW."

Possible experiments may be conducted on datasets to show gain in performance by using the aforementioned algorithms and/or techniques. The datasets may include a web dataset collected via user clicks on images for given queries and/or publicly available datasets.

The possible experiments may use various baselines. The baselines may include a linear ranker, such as a large margin ranking model in the style of a Passive-Aggressive Model for Image Retrieval (PAMIR) model which was shown to perform well compared to support vector machine (SVM), probabilistic latent semantic analysis (PLSA) and other methods on image ranking tasks. For ease of comparison, the same SGD process described in the algorithm above may be used (i.e., the same algorithm except that S(q)=1 for all q).

In some implementations, the algorithm described above may be relaxed as follows:

$$\sum_{q, r \in S(q), x^+ \in \chi_q^+, x^- \in \chi_q^-} \xi_{(q,r,x^+,x^-)} \text{ subject to}$$

$$\max_{s \in S(q)} f_{q,s}(x_{q,i}^+) > f_{q,r}(x^-) + 1 - \xi_{(q,r,x^+,x^-)},$$

$$\forall q, r \in S(q), x^+ \in \chi_q^+, x^- \in \chi_q^-, \text{ and}$$

$$\|W_{q,s}\|^2 \leq C, \forall q, s.$$

$$\xi_{(q,r,x^+,x^-)} \geq 0, \forall q, r, x^+, x^-.$$

That is, the same algorithm, as described above, may be used except that the max operation over negative examples may not be present in the constraints, but instead one separate constraint per sense may be used.

A rand-rand relaxation may be used to further simplify the algorithm by removing the max operations altogether. This leaves us with the following optimization problem: minimize $$\sum_{q, r \in S(q), r' \in S(q), x^+ \in \chi_q^+, x^- \in \chi_q^-} \xi_{(q,r,r',x^+,x^-)} \text{ subject to}$$

-continued $$f_{q,r}(x^+) > f_{q,r'}(x^-) + 1 - \xi_{(q,r,r',x^+,x^-)},$$

$$\forall q, r \in S(q), r' \in S(q), x^+ \in \chi_q^+, x^- \in \chi_q^-, \text{ and}$$

$$\|W_{q,s}\|^2 \leq C, \forall q, s,$$

$$\xi_{(q,r,r',x^+,x^-)} \geq 0, \forall q, r, r', x^+, x^-.$$

Without any max operations during training at all, the learning of the parameters for each sense may become decoupled and this may be equivalent to learning an ensemble of S(q) rankers.

As described above, image representations may be used. For example, various spatial and/or multiscale color and texton histograms may be combined for a total of about 5×10⁵ dimensions. There may be about 50,000 non-zero weights per image. Kernel principal component analysis (PCA) may be performed on the combined feature representation using the intersection kernel to produce a 100 dimensional input vector for training the model. The training on these features for the related task of image annotation may outperform a sparse bag-of-visual term features.

Here, a log of image activity may be used. The log may include, for example, for each (query, image) pair, a quantity of anonymized user clicks that have been recorded, which may be an indicator that users believe this image is relevant for the given query.

As discussed above, a publicly-available dataset (e.g., ImageNet dataset) may be used. The dataset may be organized according to the semantic hierarchy of WordNet. Multiple words or phrases can belong to multiple senses. For example, "cell" may belong to a sense for cell phones and jail cells.

Various evaluation metrics may be used to evaluate performance of the above-described algorithm(s), including pairwise-ranking loss (AUC) and precision@k. The pairwise-ranking loss, or AUC, is measured per-query q using:

$$\frac{1}{|\chi^+||\chi^-|} \sum_{x^+ \in \chi_q^+, x^- \in \chi_q^-} I(f_q(x^-) > f_q(x^+)).$$

Report results may be averaged over all queries. Precision@k may be calculated by first ranking all images (both positive and negative) for a given query, and then looking at the top k ranked images:

$$p@k(q) = \frac{\sum_{i=1,\ldots,k} I(x_i \in \chi_{II}^+)}{k}$$

where $x_1$ is the top ranked image, $x_2$ is in second position, etc.

Table 1 illustrates possible test results that may be generated when using the algorithm described above (hereinafter, referred to as IMAX) compared to baseline methods on Web Data and ImageNet.

TABLE 1

| Algorithm | ImageNet | | Web-data | |
| --- | --- | --- | --- | --- |
| | AUC | p @ 10 | AUG | p @ 10 |
| IMAX | 7.7% | 70.37% | 7.4% | 64.53% |
| LINEAR ranker | 9.1% | 65.60% | 7.9% | 60.21% |

TABLE 1-continued

|  | ImageNet | | Web-data | |
| --- | --- | --- | --- | --- |
| Algorithm | AUC | p @ 10 | AUG | p @ 10 |
| RAND-RAND relxtn. | 8.7% | 66.46% | 8.1% | 58.93% |
| MAX-RAND relxtn. | 8.3% | 67.99% | 7.7% | 62.61% |

As shown in Table 1, IMAX may outperform LINEAR rankers on both datasets for both metrics, and also may outperform the relaxed optimization problems that approximate IMAX. The two relaxed optimization problems that approximate IMAX may perform worse than IMAX. In fact, RAND-RAND, which avoids using the max function completely during training, may not perform any better as compared to a LINEAR ranker. RAND-RAND may fail to recover the senses of the queries. The MAX-RAND relaxation on the other hand, which does use the max but only for positive examples, may bring roughly half the gains of IMAX.

Tables 2 and 3 below show the AUC for training, validation, and test sets:

TABLE 3

|  | Data set | s = 1 | s = 2 | s = 3 | s = 4 | s = 5 | Best s |
| --- | --- | --- | --- | --- | --- | --- | --- |
| IMAX | Training set | 7.5% | 5.8% | 5.2% | 4.9% | 4.7% | 4.9% |
|  | Validation set | 9.1% | 8.1% | 7.9% | 7.9% | 7.8% | 7.3% |
|  | Test set | 9.1% | 8.2% | 7.9% | 7.9% | 7.8% | 7.7% |
| MAX-RAND | Training set | 7.4% | 6.7% | 6.4% | 6.3% | 6.1% | 6.1% |
| RELAXATION | Validation set | 9.2% | 8.7% | 8.6% | 8.6% | 8.5% | 7.9% |
|  | Test set | 9.1% | 8.8% | 8.7% | 8.7% | 8.5% | 8.3% |
| RAND-RAND | Training set | 7.5% | 7.3% | 7.1% | 7.1% | 7.1% | 7.1% |
| RELAXATION | Validation set | 9.1% | 8.9% | 8.9% | 8.8% | 8.7% | 8.5% |
|  | Test set | 9.1% | 8.9% | 8.9% | 8.8% | 8.8% | 8.7% |

Tables 2 and 3 show results both for the selected number of senses chosen by validation error (Best s) and by fixing s to be the same value for every query (note, "Best s" is variable per-query). The gains may occur going from s=1 to s=2, although the error is still decreasing slightly even at fixed s=5.

Similar conclusions may be made about precision@k from Tables 4 and 5 below:

TABLE 4

|  | Dataset | s = 1 | s = 2 | s = 3 | s = 4 | s = 5 | Best s |
| --- | --- | --- | --- | --- | --- | --- | --- |
| IMAX | Training | 82.51% | 84.83% | 85.45% | 86.86% | 86.49% | 86.15% |
|  | Validation | 60.81% | 63.13% | 64.05% | 64.74% | 65.66% | 73.80% |
|  | Test | 60.37% | 63.06% | 64.76% | 65.11% | 65.71% | 64.53% |
| MAX-RAND | Training | 82.07% | 83.55% | 83.43% | 84.26% | 83.62% | 83.98% |
| RELAXATION | Validation | 60.54% | 61.04% | 61.23% | 60.95% | 61.13% | 70.44% |
|  | Test | 61.09% | 61.73% | 61.55% | 61.59% | 61.96% | 62.61% |
| RAND-RAND | Training | 82.97% | 82.31% | 82.17% | 82.08% | 82.74% | 82.86% |
| RELAXATION | Validation | 59.50% | 59.69% | 59.07% | 59.11% | 59.15% | 65.52% |
|  | Test | 59.18% | 58.76% | 59.04% | 58.51% | 59.09% | 58.93% |

TABLE 5

|  | Data set | s = 1 | s = 2 | s = 3 | s = 4 | s = 5 | Best s |
| --- | --- | --- | --- | --- | --- | --- | --- |
| IMAX | Training set | 82.26% | 84.61% | 86.31% | 87.16% | 87.52% | 88.38% |
|  | Validation set | 60.19% | 62.83% | 63.94% | 64.49% | 65.09% | 73.50% |
|  | Test set | 60.97% | 63.69% | 64.86% | 65.62% | 65.15% | 68.74% |
| MAX-RAND | Training | 81.78% | 83.02% | 83.94% | 84.74% | 83.94% | 85.45% |
| RELAXATION | Validation | 60.76% | 61.29% | 61.78% | 62.28% | 61.91% | 70.97% |
|  | Test | 60.46% | 61.68% | 61.50% | 62.30% | 61.50% | 65.00% |

TABLE 2

|  | Data set | s = 1 | s = 2 | s = 3 | s = 4 | s = 5 | Best s |
| --- | --- | --- | --- | --- | --- | --- | --- |
| IMAX | Training set | 5.2% | 3.7% | 3.0% | 2.8% | 2.6% | 2.8% |
|  | Validation set | 7.8% | 7.7% | 7.6% | 7.5% | 7.5% | 6.9% |
|  | Test set | 7.9% | 7.6% | 7.6% | 7.5% | 7.5% | 7.4% |
| MAX-RAND | Training set | 5.2% | 4.3% | 3.9% | 3.8% | 3.6% | 4.1% |
| RELAXATION | Validation set | 8.0% | 8.0% | 8.0% | 8.0% | 8.1% | 7.2% |
|  | Test set | 7.9% | 7.8% | 7.8% | 7.8% | 7.9% | 7.7% |
| RAND-RAND | Training set | 5.2% | 5.2% | 5.3% | 5.3% | 5.3% | 5.2% |
| RELAXATION | Validation set | 7.9% | 7.9% | 7.9% | 7.9% | 7.9% | 7.5% |
|  | Test set | 8.0% | 8.0% | 8.0% | 8.0% | 8.0% | 8.1% |

Figure 5:
FIGS. 5-7 are diagrams illustrating examples of discovered senses of different queries.

FIG. 5 is a diagram that illustrates possible IMAX ranking functions $f(q, s)$ for three discovered senses s=1, 2, and 3 of a query "palm" from Web Data. As shown in FIG. 5, sense 1 of the query "palm" may focus on phones, sense 2 of the query "palm" may focus on plants, and sense 3 of the query "palm" may focus on beaches.

Figure 6:
Figure 6:
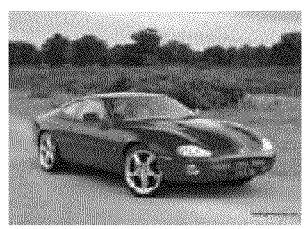
Figure 6:
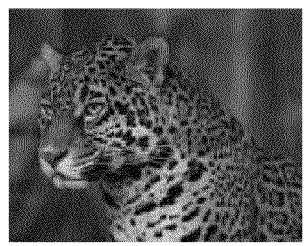
Figure 6:
Figure 6:
Figure 6:
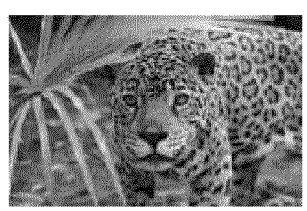
Figure 6:
Figure 6:
Figure 6:
Figure 6:
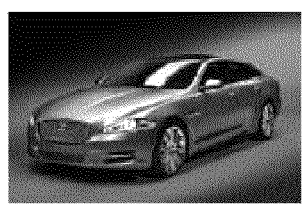
Figure 6:
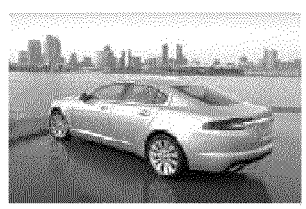
Figure 6:
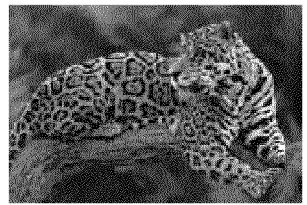
Figure 6:
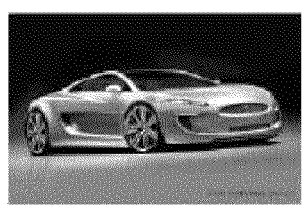
Figure 6:
Figure 6:

FIG. 6 is a diagram that illustrates possible IMAX ranking functions $f(q, s)$ for three discovered senses s=1, 2, and 3 of a query "jaguar" from Web Data. As further shown in FIG. 6, sense 1 of the query "jaguar" may focus on a first type of car model, and sense 2 of the query "jaguar" may focus on a second type of car model, which may be slightly different from the first type of car model. As further shown in FIG. 6, sense 3 of the query "jaguar" may focus on panthera.

Table 6, below, illustrates nearest annotations for each sense, e.g., s=1, 2, 3, that may be learned by IMAX for two queries: "jaguar" and "palm." The nearest annotations show that IMAX may clearly capture different senses of these queries. FIGS. 5 and 6, discussed above, illustrate retrieved images that correspond to the nearest annotations.

TABLE 6

| | |
|---|---|
| jaguar s = 1 | jaguar logo, jaguar xf, mazda, jaguar xk, jaguar xj, chrysler 300m, jaguar xkr, porsche, toyota, hyundai, aston martin vanquish, e coupe, citroen metropolis, 911 turbo, mclaren mercedes, vw passat 2011, bugatti 2010. |
| jaguar s = 2 | seat ibiza 2010, volkswagen polo, peugeot 308 cc, challenger 2010, tengerpart, citroen c4 tuning, iarna, polo 9n, yves tanguy, 308 cc, parachute, duvar sticker, asx, toyota yaris, seat toledo, seat ibiza et, honda accord coupe, hanna barbera, corolla 2011, cyd charisse. |
| jaguar s = 3 | jaguar animal, bengal tiger, tigar, amus leopard, harirnau, tiger pictures, gepard, tijgers, leopardos, bengal tigers, big cats, cheetah, tigre. |
| palm s = 1 | blackberry, lg gd900, uture phones, blackberry 9800, blackberry 9800 torch, smartphone, blackberry curve, nokia e, nokia phones, lg phones, cellulari nokia, nokia, nokia mobile phones, blackberry pearl, nokia mobile, lg crystal, smartphones. |
| palm s = 2 | palmier, palm tree, coconut tree, money tree, dracaena, palme, baum, olive tree, tree clip art, tree clipart, baobab, dracena, palma, palm tree clip art, palmera, palms, green flowers, palm trees, palmeras. |
| palm s = 3 | palmenstrand, beautiful beaches, playas paradisiacas, palms, beaches, lagoon, tropical beach, maldiverna, polinesia, tropical beaches, beach wallpaper, beautiful beach, praias, florida keys, paisajes de playas, playas del caribe, ocean wallpaper, karibik, tropical islands, playas. |

As shown in Table 6, the nearest annotations for each discovered sense for "jaguar" and "palm" may be computed. Table 6 shows that for "jaguar," sense 3 is close to "jaguar animal," "bengal tiger," and many other panthera-related queries, e.g., more than ten queries. Sense 1 of the query "jaguar", on the other hand, is close to "jaguar logo", "jaguar xf", "mazda" and "jaguar xk"—a car model-related query. Similarly for "palm," sense 1 is related to "blackberry" and "smartphones", sense 2 of the query "palm" is related to "palm tree" and "coconut tree", and sense 3 focuses on "beautiful beaches", "tropical beach" and so on, including, for example, images of the palm on a beach, rather than just the tree itself.

Breakdowns of the number of queries that are predicted S senses by IMAX, together with the AUC loss for only that subset of the queries, are given in Tables 7 and 8 for Web Data and ImageNet respectively below.

Table 7 illustrates possible AUC loss averaged over queries with the predicted number of senses S on ImageNet. For 6% of queries, IMAX may predict only one sense and hence may get the same error rate as a LINEAR ranker. For S>1, IMAX may outperform LINEAR:

TABLE 7

| S | Num. queries | LINEAR AUG | IMAX AUG | Gain |
|---|---|---|---|---|
| 1 | 23 | 4.67 | 4.67 | +0.00 |
| 2 | 42 | 9.79 | 8.76 | +1.03 |

TABLE 7-continued

| S | Num. queries | LINEAR AUG | IMAX AUG | Gain |
|---|---|---|---|---|
| 3 | 68 | 9.63 | 8.44 | +1.19 |
| 4 | 108 | 9.09 | 7.48 | +1.61 |
| 5 | 118 | 9.52 | 7.70 | +1.82 |

Table 8 illustrates possible AUC loss averaged over queries with the predicted number of senses S on Web Data. For 15% of queries, IMAX may predict only one sense and hence gets the same error rate as a LINEAR ranker. For S>1, IMAX may outperform LINEAR.

TABLE 8

| S | Num. queries | LINEAR AUG | IMAX AUC | Gain |
|---|---|---|---|---|
| 1 | 71 | 7.24 | 7.24 | +0.00 |
| 2 | 118 | 7.53 | 7.23 | +0.30 |
| 3 | 107 | 8.11 | 7.59 | +0.52 |
| 4 | 138 | 8.18 | 7.54 | +0.64 |
| 5 | 131 | 8.22 | 7.67 | +0.55 |

In some implementations, the more senses IMAX may predict for a query, the more likely there is a gain over the LINEAR ranker.

Tables 9 and 10, below, for Web Data and ImageNet respectively illustrate top wins and losses per query. A win for a query may occur when a relevance of the image results for the query improves and a loss may occur for the query when the relevance of the image results deteriorates. On ImageNet, the top wins may be much bigger in terms of gain than the worst losses are in terms of negative gain (loss). For Web Data, the wins may most likely be multiple meaning queries such as "bass" (guitar, fish), "ape" (animal, footwear, vehicle), "axe" (deodorant, weapon), "fox" (animal, Megan Fox), and "broadway" (street images, theatre images, posters).

As described above, Table 9, below, illustrates examples of the top ten best and worst possible performing queries for IMAX on Web Data. The loss or gain in AUC are compared to the baseline LINEAR ranker.

TABLE 9

| query | S | Gain | query | S | Gain |
|---|---|---|---|---|---|
| axe | 4 | +5.00 | kim sun ah | 4 | −3.14 |
| la barbie | 4 | +4.23 | brontosaurus | 3 | −2.72 |
| bass | 5 | +4.20 | fotos para turnblr | 2 | −2.37 |
| strange people | 5 | +3.97 | tapety hd | 5 | −2.24 |
| naga | 3 | +3.96 | eduardo costa | 5 | −2.12 |
| ape | 5 | +3.77 | poni | 4 | −1.71 |
| hart | 2 | +3.62 | china | 4 | −1.65 |
| broadway | 4 | +3.44 | solo | 3 | −1.58 |
| physiotherapy | 3 | +3.32 | ibiza party | 4 | −1.56 |
| fox | 4 | +3.36 | vlada roslyakova | 4 | −1.53 |

Table 10, below, illustrates examples of the top ten best and worst possible performing queries for IMAX on ImageNet. The loss or gain in AUC compared to the baseline LINEAR ranker is shown.

TABLE 10

| query | S | Gain | query | S | Gain |
|---|---|---|---|---|---|
| stock | 4 | +8.89 | hair | 5 | −2.80 |
| rig | 5 | +8.44 | return | 3 | −2.73 |
| lap | 2 | +7.80 | guard | 2 | −2.31 |
| dub | 4 | +7.36 | stamp | 2 | −1.86 |

TABLE 10-continued

| query | S | Gain | query | S | Gain |
|---|---|---|---|---|---|
| lock | 5 | +7.00 | bond | 5 | −1.76 |
| jack | 4 | +6.39 | wash | 3 | −1.41 |
| roller | 5 | +6.12 | restraint | 5 | −1.41 |
| capsule | 4 | +5.67 | sweep | 4 | −1.29 |
| head | 3 | +5.60 | pull | 4 | −1.17 |
| brass | 5 | +5.52 | extension | 3 | −1.06 |

Figure 7:
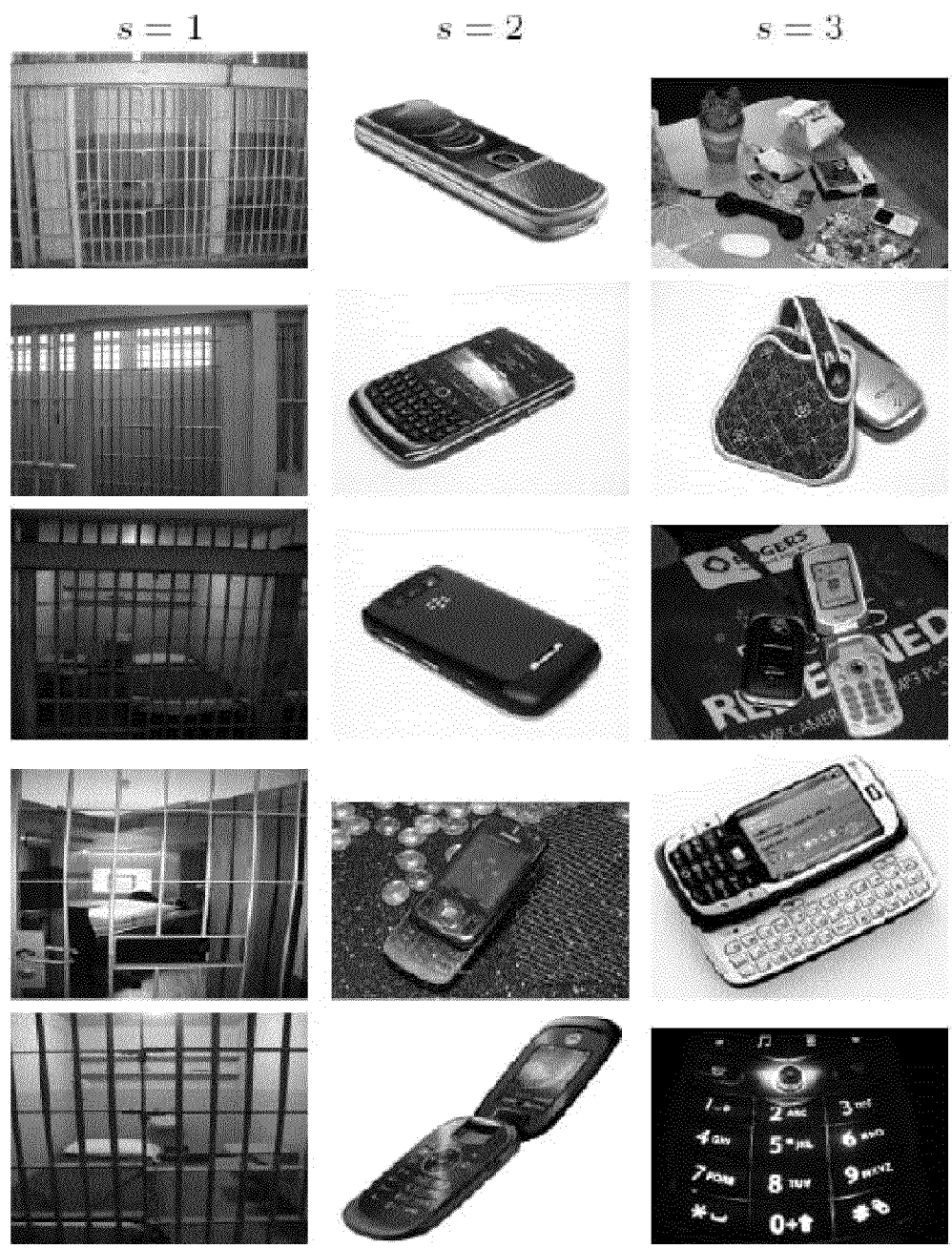

FIG. 7 is a diagram that illustrates possible IMAX ranking functions $f(q, s)$ for three discovered senses s=1, 2, 3 of a query "cell" from ImageNet. As shown in FIG. 7, for the query "cell," sense 1 may focus on jail cells, sense 2 may focus on a first type of cell phone images, and sense 3 may focus on a second type of cell phone images, which is different from the first type of cell phone images.

The senses learned by the model may be analyzed. Possible IMAX sub-model ranking functions for two queries from Web Data, "jaguar" and "palm," and one query from ImageNet, "cell" are shown in FIGS. 5-7, as described above. With regard to each of FIGS. 5-7, S=3 senses may be predicted and the image ranking given by $f(q, s)$ for s=1, 2, 3 are shown (the combined ranking $f(q)$ is a combination of using the max function, not shown). Each sub-model may be focused on a different sense or aspect for those queries. For the query "palm," the model may have learned phones, plants, and beach images in the three different sub-models. For the query "jaguar," the model may have learned animals, and two different types of car models. For the query "cell," the model may have learned jail cells and two types of cell phone images.

The techniques and/or the algorithm(s), described above, may be used for determining the senses of word queries and the images that are retrieved for that query. Using the senses to rank the images may improve ranking metrics compared to methods that do not model the senses across random queries on average, and particularly for queries that are known to be ambiguous. Simultaneously, the model may be interpretable, and may be used for discovering the senses that have been learned. Additionally, or alternatively, the techniques and/or the algorithm(s) may also be used for tasks other than image ranking, such as document retrieval.

Figure 8:
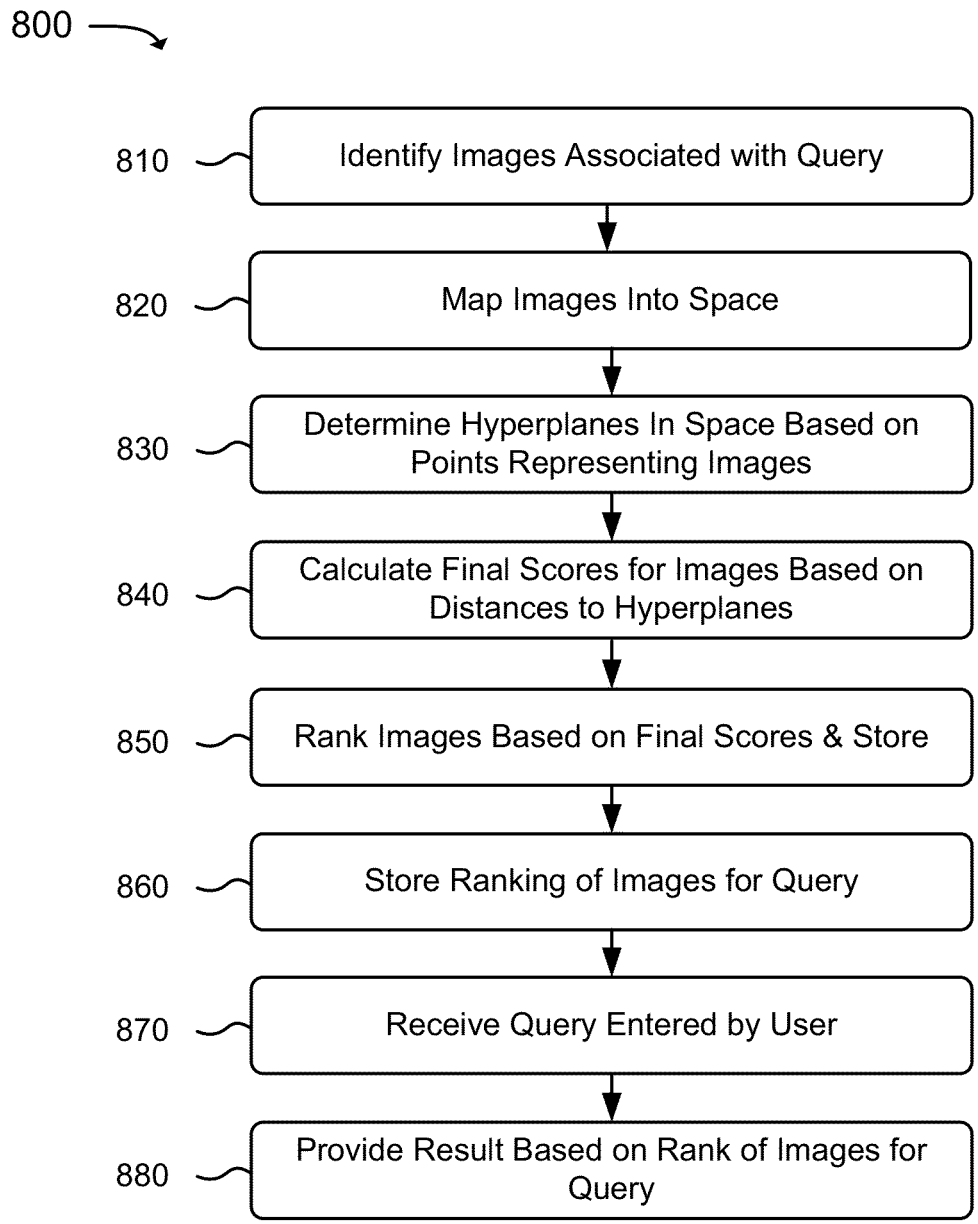
FIG. 8 is a flow chart illustrating an example process for using senses of a query to rank images associated with the query.

FIG. 8 is a flow chart illustrating an example process 800 for using senses of a query to rank images associated with the query. In some implementations, server 220 may perform process 800. In other implementations, one or more other devices, separate from, or in combination with, server 220, may perform some or all of process 800. Process 800 is described below with reference to FIG. 8.

Figure 9:
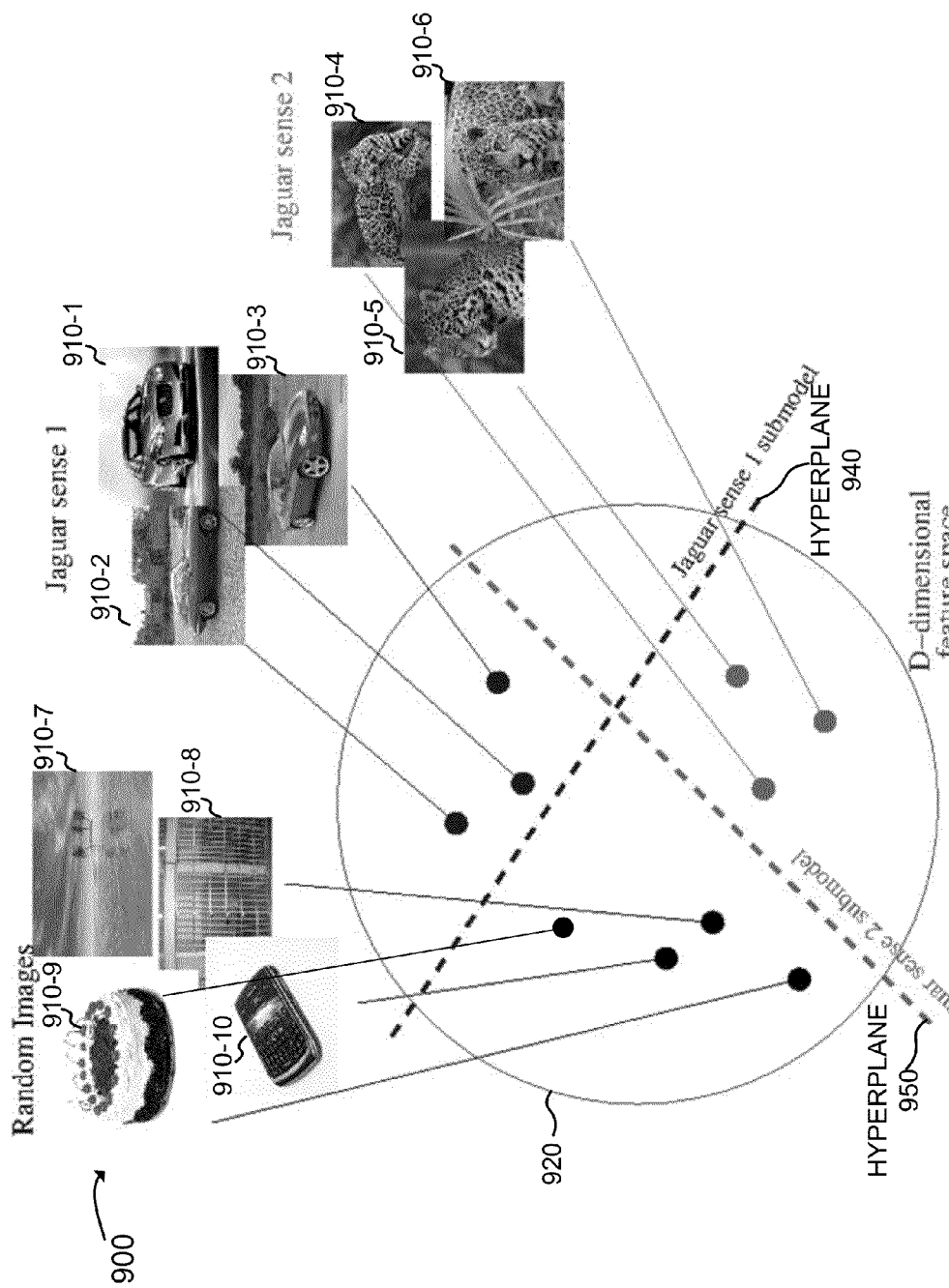
FIG. 9 illustrates an example representation of using senses associated with a query.

As shown in FIG. 8, process 800 may include identifying images associated with a query (block 810). For example, server 220 may receive images for a query. Server 220 may identify the images offline, e.g., before a user submits an image search request based on a query. The images may be identified for the query based on information regarding click-through to one or more of the images for the query and/or labeling, by, for example, humans, of one or more of the images with terms related to the query. As shown in FIG. 9, server 220 may identify images 910-1 through 910-10 for the query "Jaguar."

Process 800 may further include mapping the images into a space (block 820). For example, server 220 may select a multi dimensional space 920, e.g., a 100 or 1,000 dimensional space, to create a representation of the images, associated with the query, in relation to one another. Server 220 may, for example, represent each one of images 910-1 through 910-10 with a point in space 920. For example, server 220 may select a position in space 920 for image 910-1 based on characteristics of image 910-1 in relation to characteristics of images 910-2 through 910-10. The characteristics may relate to the senses of the query. Server 220 may map image 910-1 into space 920 by placing a point that represents image 910-1 at the selected position. Server 220 may place points for images 910-2 and 910-3 relatively near the point for image 910-1 because images 910-1 through 910-3 are in the same sense, e.g., car sense, of the query. Server 220 may place points for images 910-4 through 910-6 relatively close to one another because images 910-4 through 910-6 are in the same sense, e.g., cat sense, of the query. Server 220 may place points for images 910-7 through 910-10 in areas, of space 920, that are away from the areas where points for images 910-1 through 910-6 are placed because images 910-7 through 910-10 are not associated with either of the senses of the query, e.g., not in the car sense or the cat sense.

Process 800 may also include determining hyperplanes in the space based on points representing the images (block 830). For example, server 220 may identify a first sense of the query that includes images 910-1 through 910-3 based on a grouping of images 910-1 through 910-3 in a particular area of space 920. Server 220 may determine a hyperplane 940 that separates the points that represent images 910-1 through 910-3 from all other points in space 920. For example, all of the points on one side of hyperplane 940 represent images of JAGUAR cars, while all of the points on the other side of hyperplane 940 represent images that are not of JAGUAR cars. Hyperplane 940 may create a first sub-model, of a model represented by space 920 for the query, for the first sense of the query. Server 220 may identify a second sense of the query that includes images 910-4 through 910-6 based on a grouping of images 910-4 through 910-6 in another particular area of space 920. Server 220 may determine a hyperplane 950 that separates the points that represent images 910-4 through 910-6 from all other points in space 920. For example, all of the points on one side of hyperplane 950 represent images of Jaguar cats, while all of the points on the other side of hyperplane 950 represent images that are not of Jaguar cats. Hyperplane 950 may create a second sub-model, of the model, for the second sense of the query.

Process 800 may also include calculating final scores for images based on distances between the points and the hyperplanes (block 840). In some implementations, server 220 may calculate scores based on each one of the senses of a query. For example, server 220 may calculate, for each one of images 910-1 through 910-10, a first sense score based on hyperplane 940 and a second sense score based on hyperplane 950. The first sense score may equal a value that represents a distance, in space 920, between a point that represents one of images 910-1 through 910-10 and a line that represents hyperplane 940. The second sense score may equal a value that represents a distance, in space 920, between a point that represents one of images 910-1 through 910-10 and a line that represents hyperplane 950. Server 220 may calculate a final score, for each one of images 910-1 through 910-10. The final score, for a particular one of images 910-1 through 910-10, may equal or be based on a maximum of the first sense score and the second sense score of the particular one of images 910-1 through 610-10, an average of the first sense score and the second sense score, a sum of the first sense score and the second sense score, a product of the first score and the second score, etc.

For example, for image 910-1, server 220 may calculate a first sense score of 0.5 and a second sense score of −1. Server 220 may calculate a final score of 0.5 for image 910-1 because the first sense score of 0.5 is greater than the second sense score of −1. Server 220 may calculate final scores for images 910-7 through 910-10 that are less than a final score calculated for any one of images 910-1 through 910-6 because images 910-7 through 910-10 are farther from both lines representing hyperplanes 940 and 950 than any one of images 910-1 through 910-6.

In another implementation, server 220 may assign different weights to the first sense score and the second sense score. As a result, server 220 may calculate the final score by calculating a weighted first sense score based on a first weight and the first sense score; calculating a weighted second sense score based on a second weight and the second sense score. The final score, for a particular one of images 910-1 through 910-10, may equal, for example, a maximum of the weighted first sense score and the weighted second sense score. Server 220 may adjust the weights based on various factors, such as based on click-through rates for first images associated with the first sense versus second images associated with the second sense when the first images and the second images are provided in search results documents for the query.

Process 800 may also include ranking the images based on the final scores (block 850) and storing the ranking of the images for the query (block 860). In some implementation, server 220 may rank images 910-1 through 910-10 based on the final scores calculated for images 910-1 through 910-10. In the example of FIG. 9, server may rank images 910-1 through 910-6 higher than images 910-7 through 910-10 because the final scores of images 910-1 through 910-6 are higher than the final scores of images 910-7 through 910-10. For example, assume that the following final scores are calculated for images 910-1 through 910-10, respectively: 0.5, 0.4, 0.3, 0.6, 0.35, 0.2, −2, −1, −0.5, and −1.5. Based on these final scores, server 220 may rank images 910-1 through 910-10 in the following order, from highest rank to lowest rank: image 910-4, image 910-1, image 910-2, image 910-5, image 910-3, image 910-6, image 910-9, image 910-8, image 910-10, and image 910-7.

Process 800 may also include receiving the query as entered by a user (block 870) and providing results based on the rank of images for the query (block 880). In some implementation, a user may use client 210 to provide the query to image search engine 225 of server 220. Server 220 may receive the query from client 210. Server 220 may retrieve the stored ranking of the images for the query. Server 220 may retrieve a particular quantity of images that are highest-ranked, of the stored ranking of the images, for the query. For example, the user may enter the query "Jaguar" into the image search interface. Server 220 may retrieve five top-ranked images of images 910-1 through 910-10 based on the ranking of the images associated with the query "Jaguar." The five top-ranked images may include only images that are associated with the first sense or the second sense of the query, e.g., five images of images 910-1 through 910-6, because these are the highest ranking images. The five top-ranked images may not include images that are not associated with any one of the senses of the query, e.g., images 910-7 through 910-10. Server 220 may provide the five top-ranked images as a search result document to client 210. Client 210 may display representations of the five top-ranked images. Further to the example above, the search result document may include: image 910-4, image 910-1, image 910-2, image 910-5, and image 910-3.

In the implementation described above, a portion of process 800, described above with reference to blocks 810-860, is performed offline, while a portion of process 800 described above with reference to blocks 870 and 880 is performed on-line in response to the search query entered by a user. In other implementations, one or more of blocks 810-860 may be performed online, e.g., after the user enters the search query. For example, server 220 may rank the images based on the final scores (block 850) after the user enters the search query online.

The foregoing description provides illustration and description, but is not intended to be exhaustive or to limit the implementations to the precise form disclosed. Modifications and variations are possible in light of the above implementations or may be acquired from practice of these implementations. In another example, while a series of blocks has been described with regards to FIG. 8, the order of the blocks may be modified in other implementations. Further, non-dependent blocks may be performed in parallel. In addition, other blocks may be provided, or blocks may be eliminated, from the described flowchart, and other components may be added to, or removed from, the described systems.

Also, certain portions of the implementations have been described as a "component" that performs one or more functions. The term "component" may include hardware, such as a processor, an application-specific integrated circuit (ASIC), or an field programmable gate array (FPGA), or a combination of hardware and software. For example, a component may include software running on a general purpose processor—creating a specific purpose processor.

It will be apparent that aspects described herein may be implemented in many different forms of software, firmware, and hardware in the implementations illustrated in the figures. The actual software code or specialized control hardware used to implement aspects does not limit the implementations. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
  determining, by one or more server devices, a plurality of images for a query,
    one or more images, of the plurality of images, being associated with one or more senses of the query;

mapping, by the one or more server devices, the plurality of images into a space by representing the plurality of images with corresponding points in the space;

determining, by the one or more server devices, one or more hyperplanes in the space based on the corresponding points in the space, a first hyperplane, of the one or more hyperplanes, being associated with a first sense of the one or more senses, and a second hyperplane, of the one or more hyperplanes, being associated with a second sense of the one or more senses;

calculating, by the one or more server devices, one or more scores for the plurality of images based on the corresponding points and the one or more hyperplanes; and ranking the one or more images based on the one or more scores.

2. The method of claim 1, further comprising:

receiving the query; and providing a search result document for the query based on the ranking of the one or more images.

3. The method of claim 2, where the search result document comprises:

a first group of images, of the one or more images, that are associated with the first sense, and a second group of images, of the one or more images, that are associated with the second sense.

4. The method of claim 2, where the search result document does not include one of the plurality of images that is not associated with at least one of the one or more senses.

5. The method of claim 1, where determining the plurality of images for the query includes:

identifying the plurality of images for the query based on at least one of click-through information associated with the plurality of images or terms used to label the plurality of images.

6. The method of claim 1, where mapping the plurality of images into the space includes:

placing one or more first points, of the corresponding points, that are associated with the first sense into a first area of the space, placing one or more second points, of the corresponding points, that are associated with the second sense into a second area of the space, the second area being different from the first area, and placing one or more third points, of the corresponding points, that are not associated with the first sense or the second sense into a third area of the space, the third area being different from the first area and the second area.

7. The method of claim 6, where the one or more first points are located on a first side of the first hyperplane, where the one or more second points are located on a first side of the second hyperplane, and where the one or more third points are located on a second side of the first hyperplane and located on a second side of the second hyperplane.

8. The method of claim 1, where calculating the one or more scores includes:

determining a first score based on a first distance, in the space, between a particular point, of the corresponding points, and the first hyperplane;

determining a second score based a second distance, in the space, between the particular point and the second hyperplane; and determining a particular score, of the one or more scores, based on the first score and the second score, the particular score being for a particular image, of the plurality of images, that corresponds to the particular point.

9. The method of claim 8, where the particular score is equal to the first score when the first score is greater than the second score, and where the particular score is equal to the second score when the second score is greater than the first score.

10. The method of claim 8, where determining the particular score includes:

determining a first weighted score based on a first weight and the first score, determining a second weighted score based on a second weight and the second score, and determining the particular score based on the first weighted score and the second weighted score, where the first weight is based on a first click-through rate for a first portion of the one or more images associated with the first sense, and where the second weight is based on a second click-through rate for a second portion of the one or more images associated with the second sense.

11. A system comprising:

one or more processors to:

determine a plurality of images for a query, one or more images, of the plurality of images, being associated with two or more senses of the query;

place a plurality points in a space to represent the plurality of images;

determine a first hyperplane in the space based on one or more first points, of the plurality of points, that are associated with a first sense of the two or more senses;

determine a second hyperplane in the space based on one or more second points, of the plurality of points, that are associated with a second sense of the two or more senses;

calculate a plurality of scores for the plurality of images based on the plurality of points, the first hyperplane, and the second hyperplane; and rank the plurality of images based on the plurality of scores.

12. The system of claim 11, where the one or more processors are further to:

identify the query from a client device, retrieve, based on the query and the ranking of the plurality of images, a first set of images, of the one or more images, that are associated with the first sense and a second set of images, of the one or more images, that are associated with the second sense, and provide the first set of images and the second set of images to the client device.

13. The system of claim 11, where, when calculating the plurality of scores, the one or more processors are to:

determine a first score based on a first distance, in the space, between a particular point, of the plurality of points, and the first hyperplane, determine a second score based a second distance, in the space, between the particular point and the second hyperplane, and determine a particular score, of the plurality of scores, based on the first score and the second score, the particular score being for a particular image, of the plurality of images, that corresponds to the particular point.

14. The system of claim 13, where, when determining the particular score, the one or more processors are to:
   determine a first weighted score based on the first score and a first weight that is based on a first click-through rate associated with the first sense,
   determine a second weighted score based on the second score and a second weight that is based on a second click-through rate associated with the second sense, and
   determine the particular score based on the first weighted score and the second weighted score.

15. The system of claim 13, where, when determining the particular score, the one or more processors are to:
   determine that the first score is greater than the second score,
   determine that the particular image is associated with the first sense based on the first score being greater than the second score, and
   determine that the particular score is equal to the first score.

16. A non-transitory computer-readable medium storing instructions, the instructions comprising:
   one or more instructions that, when executed by at least one device, cause the at least one device to:
      identify a plurality of images associated with a query, one or more images, of the plurality of images, being associated with two or more senses of the query;
      place, into a space, a plurality of points that correspond to the plurality of images;
      determine a first hyperplane in the space based on one or more first points, of the plurality of points, that are associated with a first sense of the two or more senses;
      determine a second hyperplane in the space based on one or more second points, of the plurality of points, that are associated with a second sense of the two or more senses;
      determine a particular score for a particular image, of the plurality of images, based on a first distance from a particular point, of the plurality of points, to the first hyperplane and a second distance from the particular point to the second hyperplane,
         the particular point corresponding to the particular image; and
      rank the particular image, relative to the plurality of images, based on the particular score.

17. The non-transitory computer-readable medium of claim 16, where the one or more instructions to determine the particular score for the particular image include:
   one or more instructions that, when executed by the at least one device, cause the at least one device to:
      determine a first score based on the first distance,
      determine a second score based on the second distance,
      determine that the first score is greater than the second score,
      determine that the particular image is associated with the first sense based on the first score being greater than the second score, and
      determine that the particular score is equal to the first score after determining that the first score is greater than the second score.

18. The non-transitory computer-readable medium of claim 16, where the one or more instructions to place the plurality of points include:
   one or more instructions that, when executed by the at least one device, cause the at least one device to:
      place one or more first points, of the plurality of points, that are associated with the first sense into a first area of the space,
      place one or more second points, of the plurality of points, that are associated with the second sense into a second area of the space,
         the second area being different from the first area, and
      place one or more third points, of the plurality of points, that are not associated with the first sense or the second sense into a third area of the space,
         the third area being different from the first area and the second area.

19. The non-transitory computer-readable medium of claim 16, where the instructions further comprise:
   one or more instructions that, when executed by the at least one device, cause the at least one device to:
      receive the query from a client device,
      identify a first quantity of images, of the one or more images, that are associated with the first sense,
      identify a second quantity of images, of the one or more images, that are associated with the second sense, and
      provide, to the client device, results based on the first quantity of images and the second quantity of images.

20. The non-transitory computer-readable medium of claim 16,
   where the one or more instructions to rank the images include:
      one or more instructions that, when executed by the at least one device, cause the at least one device to:
         determine that other images, of the plurality of images, are not associated with the two or more senses of the query, and
         determine a ranking of only the one or more images that are associated with the two or more senses of the query, and
   where the one or more instructions further include:
      one or more instructions that, when executed by the at least one device, cause the at least one device to:
         receive the query from a client device, and
         provide, based on the query and the ranking, results that include only images of the one or more images.

* * * * *